United States Patent
Dumont et al.

(10) Patent No.: US 6,714,255 B2
(45) Date of Patent: Mar. 30, 2004

(54) VIDEO APPARATUS DELIVERING VIDEO SIGNALS, NOTABLY S-VIDEO SIGNALS

(75) Inventors: Frank Dumont, Singapore (SG); Chee Lam Tan, Singapore (SG); Qing Jin Zhou, Singapore (SG)

(73) Assignee: Thomson Licensing S.A., Boulogne (FR)

( * ) Notice: Subject to any disclaimer, the term of this patent is extended or adjusted under 35 U.S.C. 154(b) by 349 days.

(21) Appl. No.: 09/950,907

(22) Filed: Sep. 12, 2001

(65) Prior Publication Data

US 2002/0033898 A1 Mar. 21, 2002

(51) Int. Cl.[7] .................................................. H04N 5/50
(52) U.S. Cl. ........................ 348/569; 348/563; 348/728
(58) Field of Search ................................. 348/569, 563, 348/564, 566, 725, 728, 731, 598, 599, 600, 589, 588, 586; H04N 5/50, 5/445, 5/455, 5/44

(56) References Cited

U.S. PATENT DOCUMENTS 5,631,711 A * 5/1997 Yang .......................... 348/563
5,724,104 A * 3/1998 Eom ........................... 348/569
6,359,657 B1 * 3/2002 Westerink et al. .......... 348/584

FOREIGN PATENT DOCUMENTS

JP         10336603 A   * 12/1998 ............ H04N/7/08

* cited by examiner

Primary Examiner—Sherrie Hsia
(74) Attorney, Agent, or Firm—Joseph S. Triopli; Harvey D. Fried; Francis A. Davenport

(57) ABSTRACT

A video apparatus has a video source with a luminance output carrying a first luminance signal and a chrominance output carrying a chrominance signal, an OSD circuit generating OSD signals and a fast-blanking signal, and a connector for delivering video signals. A converter outputs a second luminance signal based on the OSD signals and a first switch is controlled by the fast-blanking signal selectively connects the converter or the luminance output to the connector and a second is switch is controlled by the fast-blanking signal selectively connects the chrominance output or a circuit generating a constant chrominance signal to the connector.

10 Claims, 1 Drawing Sheet

VIDEO APPARATUS DELIVERING VIDEO SIGNALS, NOTABLY S-VIDEO SIGNALS

FIELD OF THE INVENTION

The invention relates to a video apparatus delivering video signals, notably S-Video signals.

BACKGROUND OF THE INVENTION

S-Video signals are a possible representation of video sequences consisting of a luminance signal (generally referred to as Y) and of a chrominance signal (C). S-Video signals are for instance generated by a S-VHS video cassette recorder (VCR) or by a DVD player having a S-Video output.

It is always desirable to superimpose images or characters, for instance menus, on the video sequence delivered by the video apparatus: this superimposition is called On-Screen Display (OSD) and is usually sent out of the video apparatus (for instance to a display) as three monochrome signals (RGB format) through a Scart connector.

Two solutions have already been proposed to output the S-Video signals:

in a first solution, a dedicated S-Video connector is used;

according to a second solution, two pair of pins of the Scart connector are used, specifically the pins conventionally used for the CVBS signal and the pins conventionally used for the red monochrome signal (R).

With the first solution, as the video signal representing the video sequence goes through the S-Video connector, the video signal can be transmitted, for instance to a display, even when the Scart connector is not used. The user would then be unable to view the menus generated as OSD.

When using the second solution, the conventional pins for the red monochrome signal are not available and the OSD cannot be displayed properly.

It is desirable for a video apparatus to deliver a video signal which can also transmit OSD information in any circumstance.

FIG. 3 of patent application JP 10-336 603 A proposes a video apparatus delivering YUV signals wherein a YUV signal representing an OSD picture is superimposed on a YUV signal from a NTSC encoder by an analog switch. However, this solution needs using an OSD circuit generating a YUV signal (or a signal easily convertivle to YUV), which is not conventional; or, when using a conventional OSD circuit generating analogue RGB signals, a costly dedicated RGB to YUV converter must be provided in addition.

SUMMARY OF THE INVENTION

The invention provides a video apparatus delivering video signals wherein OSD superimposition is realised in a cost effective way whatever the used OSD circuit, while keeping at the same time a good quality of superimposition, i.e. for instance without any colour hue.

The invention provides a video apparatus comprising a video source with a luminance output carrying a first luminance signal, an OSD circuit generating OSD signals and a fast-blanking signal, and a connector for delivering video signals, wherein a converter outputs a second luminance signal based on the OSD signals, wherein a first switch controlled by the fast-blanking signal selectively connects the converter or the luminance output to the connector, wherein the video source has a chrominance output carrying a chrominance signal and wherein a second switch controlled by the fast-blanking signal selectively connects the chrominance output or a circuit generating a constant chrominance signal to the connector.

According to prefered embodiments, the constant chrominance signal is a constant voltage;
a voltage divider generates said constant voltage;
said OSD signals are three monochrome signals;
said converter is a resistor matrix network;
said connector delivers S-Video signals;
said connector is a Scart connector;
said connector is a S-Video connector;
said video source is a S-Video source;
said connector delivers S-Video signals and said video source is a S-Video source.

BRIEF DESCRIPTION OF THE DRAWINGS

The invention and other features thereof will be understood in the light of the following description made with reference to the attached drawings where.

DETAILED DESCRIPTION OF PREFERED EMBODIMENTS

Figure 1:
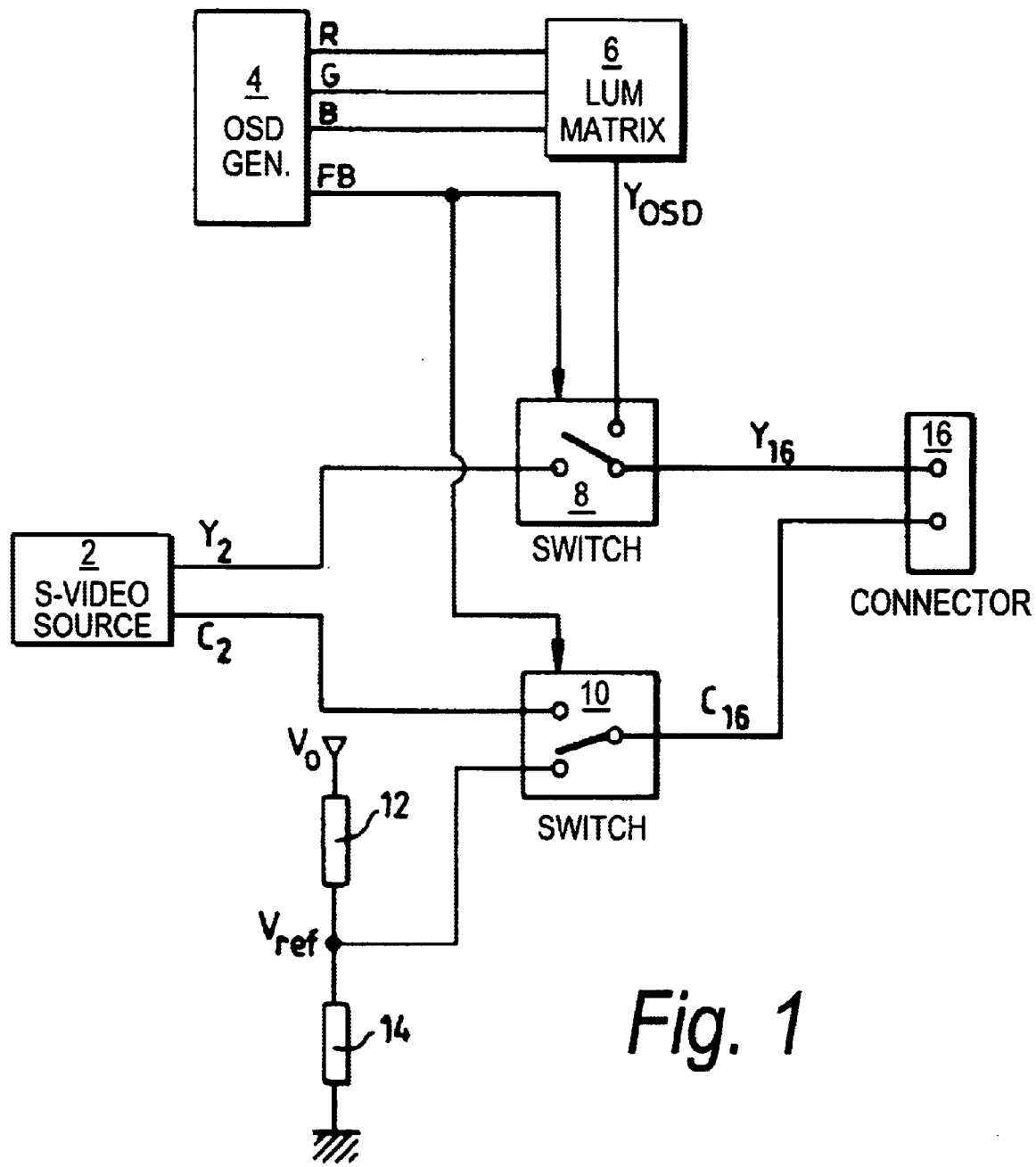
FIG. 1 represents a video apparatus realised according to the teachings of the invention.

The video apparatus of FIG. 1 is a video cassette recorder (VCR) comprising a S-Video source 2 generating a first luminance signal $Y_2$ and a first chrominance signal $C_2$, defining a S-Video signal. In the present embodiment, the S-Video source 2 is a MPEG decoder ST15500 from ST fed by a bit-stream processor SAA6700H from Philips according to data read on a tape in a digital format, for instance D-VHS. According to a possible variation, the S-Video signal is provided by a conventional S-Video circuit of a S-VHS VCR.

The video apparatus also has an OSD circuit 4 generating three monochrome signals R, G and B (respectively red, green and blue monochrome signals) representing images to be superimposed on the video sequence of the S-Video signals. The OSD circuit also generates a fast-blanking signal FB indicating when the monochrome signals R, G and B should be taken into consideration.

Of course, the S-Video source 2 and the OSD circuit 4 cooperate in a conventional manner (not shown) in order to synchronise the fast-blanking signal FB (and thus the monochrome signals R, G and B) with the first luminance signal $Y_2$.

The monochrome signals R, G, and B are converted into a corresponding second luminance signal $Y_{OSD}$ in a converter 6, which can for instance be a resistor matrix network. The second luminance signal $Y_{OSD}$ thus represents a black-and-white image of the OSD to be inserted.

The first luminance signal $Y_2$ and the second luminance signal $Y_{OSD}$ are respectively transmitted to a first input and to a second input of a first switch 8. The first switch 8 is controlled by the fast blanking signal FB to selectively output $Y_2$ or $Y_{OSD}$ on a first pin of a connector 16.

More precisely, when the fast-blanking signal FB is at a low level (meaning no OSD insertion should be realised at this specific moment), the first switch 8 connects the S-Video source 2 to the connector 16 concerning luminance. When the fast-blanking signal FB is at a high level, the first switch 8 connects the OSD circuit 4 and converter 6 to the connector 16 to superimpose the black-and-white image where needed.

The first switch 8 thus realises the actual OSD insertion.

A second switch 10 receives on a first pin the first chrominance signal $C_2$ and on a second pin a constant second chrominance signal $V_{ref}$. As indicated on FIG. 1, the second chrominance signal $V_{ref}$ can be realised by a voltage divider comprising a first resistor 12 and a second resistor 14 in series with ground a constant voltage $V_0$ (for instance 5 V), the common point of the first and second resistors thus generating the second chrominance signal $V_{ref}$.

The second switch 12 is also controlled by the fast-blanking signal FB to selectively output the first chrominance signal $C_2$ or the second chrominance signal $V_{ref}$ to a second pin of the connector 16.

More precisely, when the fast-blanking signal is at a low level, the second switch 10 connects the S-Video source 2 to the connector 16 for chrominance. When the fast-blanking signal is at a high level, the second switch 10 connects the voltage divider to the second pin (chrominance pin $C_{16}$) of the connector 16, thus setting the second pin of the connector 16 to a pre-determined level indicating the signal to be superimposed is black-and-white.

Thanks to the second switch 10, the first chrominance signal $C_2$ is not used during OSD insertion; this avoids an unpleasant color hue which would otherwise be present.

The connector 16 is meant to deliver at least the S-Video signal with OSD insertion to another video apparatus. It can be of any type, notably a conventional 4-pin S-Video connector or a Scart connector.

The invention also applies to other types of video apparatus delivering S-Video signals, for instance to DVD players having a S-Video output.

What is claimed is:

1. A video apparatus comprising:

a video source with a luminance output carrying a first luminance signal, an OSD circuit generating OSD signals and a fast-blanking signal, a connector for delivering video signals, a converter outputting a second luminance signal based on the OSD signals and a first switch controlled by the fast-blanking signal and selectively connecting the converter or the luminance output to the connector, wherein the video source has a chrominance output carrying a chrominance signal and wherein a second switch controlled by the fast-blanking signal selectively connects the chrominance output or a circuit generating a constant chrominance signal to the connector.

2. Video apparatus according to claim 1, wherein the constant chrominance signal is a constant voltage.

3. Video apparatus according to claim 2, wherein a voltage divider generates said constant voltage.

4. Video apparatus according to claim 1, wherein said OSD signals are three monochrome signals.

5. Video apparatus according to claim 1, wherein said converter is a resistor matrix network.

6. Video apparatus according to claim 1, wherein said connector delivers S-Video signals.

7. Video apparatus according to claim 6, wherein said connector is a Scart connector.

8. Video apparatus according to claim 6, wherein said connector is an S-Video connector.

9. Video apparatus according to claim 1, wherein said video source is an S-Video source.

10. Video apparatus according to claim 1, wherein said connector delivers S-Video signals and said video source is a S-Video source.

* * * * *